(12) United States Patent
Agostini et al.

(10) Patent No.: US 8,772,374 B2
(45) Date of Patent: *Jul. 8, 2014

(54) PREPARATION OF SILICA REINFORCED RUBBER COMPOSITION AND TIRE WITH COMPONENT THEREOF

(71) Applicants: Giorgio Agostini, Colmar-Berg (LU); Marc Weydert, Strassen (LU); Elena Sperotto, Luxembourg (LU)

(72) Inventors: Giorgio Agostini, Colmar-Berg (LU); Marc Weydert, Strassen (LU); Elena Sperotto, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,773

(22) Filed: Oct. 22, 2012

(65) Prior Publication Data

US 2014/0113993 A1    Apr. 24, 2014

(51) Int. Cl.
*C08J 3/20* (2006.01)
*C08K 3/34* (2006.01)

(52) U.S. Cl.
USPC ........... 523/351; 524/493; 524/495; 524/858; 524/862; 524/865; 528/25

(58) Field of Classification Search
USPC .......... 523/351; 524/493, 495, 858, 862, 865; 528/25
See application file for complete search history.

(56) References Cited

U.S. PATENT DOCUMENTS

| | | | |
|---|---|---|---|
| 4,704,414 A | 11/1987 | Kerner et al. | 523/213 |
| 6,123,762 A | 9/2000 | Barthel et al. | 106/490 |
| 6,559,240 B2 | 5/2003 | Hsu et al. | 525/332.8 |
| 6,573,324 B1 | 6/2003 | Cohen et al. | 524/492 |
| 6,735,447 B1 | 5/2004 | Muller | 455/522 |
| 6,936,669 B2 | 8/2005 | Halasa et al. | 526/260 |
| 7,214,731 B2 | 5/2007 | Zanzig et al. | 524/261 |
| 7,351,763 B2 * | 4/2008 | Linster et al. | 524/493 |
| 2010/0190885 A1 * | 7/2010 | Hua et al. | 523/152 |

FOREIGN PATENT DOCUMENTS

| | | | |
|---|---|---|---|
| EP | 1 400 560 | * 11/2003 | |
| EP | 1398347 | 3/2004 | C08L 9/06 |
| WO | 2006/110424 | 10/2006 | C08K 9/04 |

OTHER PUBLICATIONS

European Search Report received by Applicants Feb. 17, 2014.

* cited by examiner

*Primary Examiner* — Hannah Pak
(74) *Attorney, Agent, or Firm* — Henry C. Young, Jr.

(57) ABSTRACT

The invention relates to the preparation of a rubber composition containing a pre-treated precipitated silica and a tire having a component comprised of such rubber composition. The pre-treated silica is a precipitated silica having been pre-treated with a silica coupling agent comprised of an alkoxyorganomercaptosilane to form a precipitated silica/coupling agent composite prior to its blending with a rubber composition. The rubber composition preparation involves reacting said pretreated silica/coupling agent composite with a combination of bis(3-triethoxysilylpropyl) polysulfides in situ within the rubber composition.

8 Claims, No Drawings

PREPARATION OF SILICA REINFORCED RUBBER COMPOSITION AND TIRE WITH COMPONENT THEREOF

FIELD OF THE INVENTION

The invention relates to the preparation of a rubber composition containing a pre-treated precipitated silica and a tire having a component comprised of such rubber composition. The pre-treated silica is a precipitated silica having been pre-treated with a silica coupling agent comprised of an alkoxyorganomercaptosilane to form a precipitated silica/coupling agent composite prior to its blending with a rubber composition. The rubber composition preparation involves reacting said pretreated silica/coupling agent composite with a combination of bis(3-triethoxysilylpropyl) polysulfides in situ within the rubber composition.

BACKGROUND OF THE INVENTION

Various diene-based elastomers may be prepared, for example, by blending the elastomer(s) with rubber reinforcing filler such as rubber reinforcing carbon black and silica reinforcement, particularly precipitated silica, together with a coupling agent comprised of a bis(3-triethoxysilylpropyl) polysulfide to aid in coupling the silica to the elastomer and enhancing its rubber reinforcing effect. Preparation of such rubber compositions are well known to those having skill in such art.

In an alternative embodiment, the precipitated silica may be pre-treated with a silica coupling agent comprised of, for example, an alkoxyorganomercaptosilane or combination of alkoxysilane and alkoxyorganomercaptosilane prior to blending the pre-treated silica with the rubber instead of reacting the precipitated silica with the silica coupling agent in situ within the rubber. For example, see U.S. Pat. No. 7,214,731.

For various pre-treated precipitated silicas see, for example, U.S. Pat. Nos. 4,704,414, 6,123,762 and 6,573,324.

However, it has been observed that a rubber composition loaded with (having a relatively high concentration of) such pre-treated precipitated silica can provide a cured rubber composition with insufficiently desirable stiffness and, may provide an uncured rubber composition having an undesirable and readily observable largely grainy physical appearance which is considered herein to be undesirable in a sense of an observed difficulty in banding the somewhat granular condition, often occurring in individual clumps, of the rubber composition on a cylindrical mill as well as calendering and extrusion.

For this invention, it has been discovered that an addition of, and therefore an additional treatment of the already pre-treated silica in situ within the rubber composition with a combination or bis(3-triethoxysilylpropyl) polysulfides which has been observed to significantly increase stiffness of the cured rubber composition and also to substantially reduce, and tend to eliminate, the aforesaid undesirable grainy physical condition of the uncured rubber composition and to thereby render a more cohesive rubber composition.

In the description of this invention, the terms "rubber", "elastomer" and "rubbery polymer" may be used interchangeably unless otherwise indicated. The terms "cured" and "vulcanized" may be used interchangeably unless otherwise indicated.

The term "phr" refers to parts by weight of an ingredient per 100 parts by weight of rubber in a rubber composition.

Such terms are well known to those having skill in such art.

SUMMARY AND PRACTICE OF THE INVENTION

In accordance with this invention, a process of preparing a rubber composition is provided which comprises the steps of:

(A) blending a rubber composition, in at least one preliminary blending step, preferably in an internal rubber mixer, to a temperature of, for example, in a range of from about 140° C. to about 175° C., comprised of, based upon parts by weight per 100 parts by weight rubber (phr):
  (1) 100 phr of at least one conjugated diene-based elastomer;
  (2) from about 25 to about 120 phr of reinforcing filler comprised of:
    (a) pretreated silica, or
    (b) pretreated silica and at least one of rubber reinforcing carbon black and precipitated silica (non-pretreated precipitated silica);
  (3) from about 0.3 to about 8, alternately from about 1 to about 6, phr of a combination of two bis(3-triethoxysilylpropyl) polysulfides comprised of:
    (a) a first bis(3-triethoxysilylpropyl) polysulfide having an average of from 3.4 to about 3.8 connecting sulfur atoms in its polysulfidic bridge, and
    (b) a second bis(3-triethoxysilylpropyl) polysulfide having an average of from 2 to about 2.4 connecting sulfur atoms in its polysulfidic bridge, followed by:

(B) blending, in a subsequent (final) blending step, with the rubber composition from said preliminary blending step(s), preferably in an internal rubber mixer, to a temperature of, for example, in a range of from about 90° C. to about 120° C., sulfur curative comprised of elemental sulfur (without said silica coupling agent);

wherein said pre-treated silica is a precipitated silica treated with a silica coupling agent to form a composite of precipitated silica/coupling agent prior to addition to said rubber composition, wherein said silica coupling agent for said composite is comprised of:
  (1) a siloxyorganomercaptosilane, or
  (2) combination of a siloxyorganomercaptosilane and alkoxysilane.

In practice, a ratio in a range of from about 20/80 to about 80/20, alternately from about 40/60 to about 60/40, of said first and second bis(3-triethoxysilylpropyl) polysulfides may be desired.

Said process further includes sulfur curing the resulting rubber composition.

In a further embodiment, a tire contains at least one component (e.g. sulfur cured component) of such rubber composition (e.g. tire tread component).

In practice, the resulting rubber composition prepared by such process is usually desirably sulfur cured at an elevated temperature (e.g. in a range of from about 140° C. to about 160° C.).

In one embodiment, said combination of bis(3-ethoxysilylpropyl) polysulfides are blended with the rubber composition commensurate with or subsequent to addition of said pretreated silica to said rubber composition.

In practice, said preliminary blending step may be comprised of one or more blending steps.

In practice, the preliminary blending step(s) is desirably exclusive of addition of elemental sulfur.

In one embodiment, said reinforcing filler may be comprised of said pretreated silica and rubber reinforcing carbon black. In such case, said reinforcing filler may preferably be without additional precipitated silica (e.g. without precipitated silica which has not been pretreated with said coupling agent).

In a further embodiment, said reinforcing filler may be comprised of, where appropriate, said pretreated silica and precipitated silica (e.g. precipitated silica which has not been pretreated with said coupling agent) and which does not contain additional coupling agent for said precipitated silica other than said combination of bis(3-triethoxysilylpropyl) polysulfides.

In an additional embodiment, said reinforcing filler may be comprised a combination of said pretreated silica, precipitated silica and rubber reinforcing carbon black.

Accordingly, said reinforcing filler may be comprised of from 5 to about 120 phr of reinforcing filler comprised of:

(A) said pretreated precipitated silica, or (B) combination of said pre-treated precipitated silica and up to about 60, alternately up to about 20, phr of rubber reinforcing carbon black, or (C) combination of said pretreated silica and up to about 30 phr of precipitated silica (non pretreated precipitated silica), or (D) combination of said pretreated silica and up to about 40 phr of rubber reinforcing carbon black.

In the final blending step, (the productive mixing step) the sulfur curative comprised of elemental sulfur is understood to usually preferably also contain one or more sulfur cure accelerators, a practice well known to those having skill in such art.

A significant aspect of the invention is the discovered beneficial blending of a very small amount of the combination of bis(3-triethoxysilylpropyl) polysulfides with the rubber composition containing the pretreated precipitated silica.

While the mechanism may not be completely understood, a purpose of this experimentation is to evaluate whether an inclusion of the bis(3-triethoxysilylpropyl) polysulfide containing an average of from about 3.4 to about 3.8 connecting sulfur atoms can yield broken sulfur linkages sufficient to promote a degree of crosslinking with the diene-based elastomer(s) to thereby increase the viscosity, and therefore its stiffness in a sense of its dynamic storage modulus (G') and therefore its associated high shear forces within the uncured rubber composition during the rubber thermal mixing step to promote an increase in defragmentation of the silica particles to thereby beneficially increase their dispersion within the rubber composition.

However, it is appreciated that such addition of the very small amount of such alkoxysilyl polysulfide should be carefully controlled in order to prevent the increase in rubber viscosity from being excessive.

An additional purpose of this experimentation is to evaluate whether an inclusion of the very small amount of the bis(3-triethoxysilylpropyl) polysulfide containing an average of from 2 to about 2.4 connecting sulfur atoms in its polysulfidic bridge may be used to present an additional amount of siloxane in the rubber composition during its mixing stage without additional elastomer crosslinking because of an anticipated low level, or mostly non-existent, of available broken sulfur linkages to promote an additional hydrobation of the silica particles within the rubber composition and thereby better dispersion of the silica particles in the rubber composition.

It is to be appreciated that it is likely that both alkoxysilyl polysulfides, already chemically combined with the silica particles, will act to crosslink through their generated broken sulfur linkages to the diene-based elastomer(s) during the elevated temperature provided during the eventual molding and curing of the rubber composition to thereby also beneficially increase the stiffness, in terms of its dynamic storage modulus (G').

As a result, if the evaluation is successful, such small addition of a combination of both of the two alkoxysilyl polysulfides to rubber composition containing the pretreated precipitated silica will be considered as being a significant discovery beneficially improve both the silica particle dispersion through increasing the stiffness of the uncured rubber composition without significantly deteriorating the processability of the uncured rubber composition itself as well as ultimately increasing the stiffness of the cured rubber composition.

In further accordance with this invention, a rubber composition, particularly a sulfur cured rubber composition, is prepared by the process of this invention involving a combination of the bis(3-triethoxysilylpropyl) polysulfides which is considered herein to be a departure from past practice.

The process of preparing said rubber composition further comprises preparing a tire assembly comprised of a rubber tire having a component of said rubber composition and sulfur curing said tire assembly.

In further accordance with this invention, an article of manufacture is provided having at least one component comprised of said sulfur cured rubber composition.

In additional accordance with this invention a tire is provided having at least one component comprised of said sulfur cured rubber composition.

In further accordance, a tire is provided having a tread comprised of said sulfur cured rubber composition.

Further, and as hereinbefore indicated, while the mechanism, and result, of introducing said combination of bis(3-triethoxysilylpropyl) polysulfides said pre-treated precipitated silica/silica coupler composite in situ within rubber in a preliminary (non-productive) mixing step may not be fully understood, it appears that an integrated network is promoted, enabled and formed at least in part between said pre-treated silica composite and conjugated diene-based elastomer(s) with the aid of the small amount of the bis(3-triethoxysilylpropyl) polysulfides which it observed exhibited one or more of:

(A) improved processability in the sense of reduced Mooney viscosity of the uncured rubber composition, which is considered herein to be a particular benefit for processing the uncured rubber composition, for example, in a sense of promoting a reduced hot high shear degradative mixing history for the rubber composition, (B) reduced, or lower, tan delta physical and/or rebound physical property of a sulfur cured rubber composition for a predictive lower rolling resistance for a tire having a tread of such cured rubber composition for a resulting predictive improved vehicular fuel economy for a vehicle with such tires and (C) improved abrasion resistance property for a sulfur cured rubber composition which may be beneficial for a tire having a tread of such cured rubber composition.

Representative of various conjugated diene-based elastomers, including copolymers of conjugated dienes are, for example, elastomers selected from at least one of polymers of at least one of isoprene and 1,3-butadiene, copolymers of isoprene and 1,3-butadiene and copolymers of styrene with at least one of isoprene and 1,3-butadiene.

Some representative examples of said additional diene-based elastomers are, for example, cis 1,4-polyisoprene, cis 1,4-polybutadiene rubber, styrene-butadiene rubber (SBR), styrene-isoprene-butadiene terpolymer rubber (SIBR), styrene-isoprene rubber (SIR) and isoprene-butadiene rubber (IBR) and high vinyl polybutadiene rubber (HVPBD) having a vinyl 1,2-content in a range of from about 30 to about 80 percent.

In one embodiment, at least one of said elastomers may have its molecular weight increased by being a tin or silicon coupled diene-based elastomer. For example, such coupled elastomer may be a diene-based elastomer prepared by organic solvent polymerization in the presence of a suitable tin or silicon based complex using at least one of isoprene and 1,3-butadiene monomers or of styrene together with at least one of isoprene and 1,3-butadiene monomers. For example, not intended to be limiting, see U.S. Pat. No. 6,559,240. Said tin or silicon coupled elastomers may be selected from, for example, styrene/butadiene copolymers, isoprene/butadiene copolymers, styrene/isoprene copolymers and styrene/isoprene/butadiene terpolymers. The preparation of tin and silicon coupled elastomers via organic solvent polymerization is well known to those having skill in such art.

In one aspect, at least one of said elastomers may include one or more in-chain or end functionalized diene-based elastomers. For example, such functionalized elastomer may be provided as a diene-based elastomer as described above which contains one or more functional groups comprised of at least one of hydroxyl groups, carboxyl groups, amine groups, siloxy groups, and epoxy groups, particularly such groups which are available to participate in a reaction with hydroxyl groups (e.g. silanol groups) of precipitated silica reinforcement.

Exemplary of functionalized elastomers, where appropriate, are such as for example, functionalized styrene/butadiene copolymer elastomers (functionalized SBR elastomers) containing amine and/or siloxy (e.g. alkoxyl silane as SiOR) functional groups including, for example, a tin coupled styrene/butadiene elastomer containing siloxy end functionalization.

Representative of such amine functionalized SBR elastomers is, for example, SLR4601™ from Styron and T5560™ from JSR, and in-chain amine functionalized SBR elastomers mentioned in U.S. Pat. Nos. 6,735,447 and 6,936,669.

Representative of such siloxy functionalized SBR elastomers is, for example, SLR4610™ from Styron.

Representative of such combination of amine and siloxy functionalized SBR elastomers is, for example, HPR350™ from JSR.

Other and additional elastomers are functionalized styrene/butadiene copolymer elastomers (functionalized SBR elastomers) containing hydroxy or epoxy functional groups.

Representative of such hydroxy functionalized SBR elastomers is, for example, Tufdene 3330™ from Asahi.

Representative of such epoxy functionalized SBR elastomers is, for example, Tufdene E50™ from Asahi.

In practice, it is therefore envisioned that said sulfur vulcanizable elastomer may be comprised of, for example, polymers of at least one of isoprene and 1,3-butadiene; copolymers of styrene and at least one of isoprene and 1,3-butadiene; high vinyl styrene/butadiene elastomers having a vinyl 1,2-content based upon its polybutadiene in a range of from about 30 to 90 percent and functionalized copolymers comprised of styrene and 1,3-butadiene ("functionalized SBR") selected from amine functionalized SBR, siloxy functionalized SBR, combination of amine and siloxy functionalized SBR, epoxy functionalized SBR and hydroxy functionalized SBR.

It should readily be understood by one having skill in the art that said rubber composition can be compounded by methods generally known in the rubber compounding art, such as mixing the various sulfur-vulcanizable constituent diene-based elastomers with various commonly used additive materials such as, for example, curing aids, such as sulfur, activators, retarders and accelerators, processing additives, such as oils, resins including tackifying resins, plasticizers, fillers, pigments, zinc oxide, waxes, antioxidants and antiozonants, peptizing agents and the aforesaid reinforcing fillers as rubber reinforcing carbon black and synthetic amorphous precipitated silica aggregates. As known to those skilled in the art, depending on the intended use of the sulfur-vulcanizable and sulfur-vulcanized materials (rubbers), the various additives mentioned above are selected and commonly used in conventional amounts unless otherwise indicated herein.

The pneumatic tires are conventionally comprised of a generally toroidal-shaped carcass with an outer circumferential tread, adapted to be ground contacting, spaced beads and sidewalls extending radially from and connecting said tread to said beads.

Typical amounts of antioxidants may comprise, for example, 1 to about 5 phr. Representative antioxidants may be, for example, diphenyl-p-phenylenediamine and others, such as those disclosed in *The Vanderbilt Rubber Handbook* (1978), Pages 344 through 346. Suitable antiozonant(s) and waxes, particularly microcrystalline waxes, where used, may, for example, be of the type shown in *The Vanderbilt Rubber Handbook* (1978), Pages 346 and 347. Typical amounts of antiozonants where used, may, for example, comprise 1 to about 5 phr. Typical amounts of zinc oxide may, for example, comprise from 2 to about 5 phr. Typical amounts of waxes, where used, may comprise, for example, from 1 to about 5 phr. Typical amounts of peptizers, where used, may, for example, comprise from 0.1 to about 1 phr. The presence and relative amounts of the above additives are not normally considered herein as a significant aspect of the present invention.

The vulcanization of the elastomer composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. Such sulfur-vulcanizing agents may normally used, for example, in an amount ranging from about 0.5 to about 5 phr with a range of from 1.5 to 2.3 being often preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from, for example, about 0.5 to about 2 phr. In another embodiment, combinations of two or more accelerators might be used, if desired and where appropriate, in which a primary accelerator is might be used in the larger amount of, for example, from 0.5 to 1 phr, and a secondary accelerator which might be used in smaller amounts, for example, from 0.05 to 50 phr, in order to activate the sulfur vulcanization process. Combinations of such accelerators have historically been sometimes known to produce a synergistic effect of the final properties of sulfur-cured rubbers and are sometimes somewhat better than those produced by use of either accelerator alone. In addition, delayed action accelerators may be used, where appropriate which are less affected by normal processing temperatures but might produce satisfactory cures at ordinary vulcanization temperatures. Representative examples of accelerators include, for example, various amines, disulfides, diphenyl guanidine, thioureas, thiazoles, thiurams, sulfenamides, dithiocarbamates and xanthates, particularly diphenyl guanidine. The primary accelerator might be, for example, a sulfenamide such as, for example, N-cyclohexyl-2-sulfenamide. If a second accelerator is used, the secondary accelerator might be selected from, for example, the diphenyl guanidine, a dithiocarbamate or a thiuram compound.

The tire can be built, shaped, molded and cured by various methods which will be readily apparent to those having skill in the art.

Such unvulcanized tread rubber composition (e.g. in a form of an extruded rubber strip) can be applied in the building of the green (unvulcanized) rubber tire in which the uncured, shaped tread is built onto the carcass following which the green tire is shaped and cured.

Alternately, an unvulcanized, or partially vulcanized, tread rubber strip can be applied to a cured tire carcass from which the previous tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

EXAMPLE I

Conjugated diene-based elastomer compositions were prepared and identified herein as rubber Compositions A through D with the basic formulation illustrated in Table 1.

Rubber Composition A is a Control rubber composition in the sense that it contains a pretreated precipitated silica without added bis(3-triethoxysilylpropyl) polysulfide.

Rubber Composition B is an Experimental rubber composition containing only one bis(3-triethoxysilylpropyl) polysulfide, namely a first bis(3-triethoxysillylpropy) polysulfide (A) containing an average of from about 3.4 to about 3.8 connecting sulfur atoms in its polysulfidic bridge.

Rubber Composition C is an Experimental rubber composition containing only one bis(3-triethoxysilylpropyl) polysulfide, namely a second bis(3-triethoxysillylpropy) polysulfide (B) containing an average of from about 2 to about 2.4 connecting sulfur atoms in its polysulfidic bridge.

Rubber Composition D is an Experimental rubber composition containing a combination of the above two bis(3-triethoxysilylpropyl) polysulfides in a ratio of the first to second of 2/2 as illustrated in the following Table 1.

TABLE 1

| Component | Parts by Weight (phr) Samples | | | |
|---|---|---|---|---|
| | A | B | C | D |
| First Non-productive Mixing Step (NP-1) (to 160° C.) | | | | |
| Natural cis 1,4-polyisoprene rubber[1] | 80 | 80 | 80 | 80 |
| Cis 1,4-polybutadiene rubber[2] | 10 | 10 | 10 | 10 |
| Styrene/butadiene rubber[3] | 10 | 10 | 10 | 10 |
| Bis(3-triethoxysilylpropyl) polysulfide A[4] | 0 | 2 | 0 | 2 |
| Bis(3-triethoxysilylpropyl) polysulfide B[5] | 0 | 0 | 2 | 2 |
| Pre-treated precipitated silica[6] | 70 | 70 | 70 | 70 |
| Rubber processing oil[7] | 2 | 2 | 2 | 2 |
| Second Non-productive Mixing Step (NP-2) (to 160° C.) | | | | |
| Fatty acid[8] | 3 | 3 | 3 | 3 |
| Zinc oxide | 3 | 3 | 3 | 3 |

TABLE 1-continued

| Component | Parts by Weight (phr) Samples | | | |
|---|---|---|---|---|
| | A | B | C | D |
| Antidegradant, amine based | 4 | 4 | 4 | 4 |
| Microcrystalline waxes | 2 | 2 | 2 | 2 |
| Productive Mixing Step (PR) (to about 110° C.) | | | | |
| Sulfur | 1 | 1 | 1 | 1 |
| Sulfur vulcanization accelerator[9] | 1.8 | 1.8 | 1.8 | 1.8 |

[1]Natural rubber of grade SMR20
[2]Cis 1,4-polybutadiene rubber as BUD 1207 ™ from The Goodyear Tire & Rubber Company
[3]Styrene/Butadiene rubber with 23.5 percent bound styrene as Kralex 1502 ™ from Kaucuk Kralupy
[4]A composite of 50/50 ratio of rubber reinforcing carbon black and bis(3-triethoxysilylpropyl) polysulfide (A) as Si69 ™ from Degussa-Evonic comprised of bis(3-triethoxysilylpropyl) polysulfide having an average in a range of from about 3.4 to about 3.8 connecting sulfur atoms in its polysulfidic bridge
[5]A composite of 50/50 ratio of rubber reinforcing carbon black and bis(3-triethoxysilylpropyl) polysulfide (B) as Si266 ™ from Degussa-Evonic comprised of bis(3-triethoxysilylpropyl) polysulfide having an average in a range of from 2 to about 2.3 connecting sulfur atoms in its polysulfidic bridge
[6]Pretreated silica A as a composite of a reaction product of precipitated silica (synthetic amorphous silica containing hydroxyl groups) and alkoxyorganomercaptosilane which may also include an alkoxysilane as Agilon 400 ™ from PPG Industries
[7]Low PCA rubber processing oil as Extensoil 1996 ™ from Repsol
[8]Fatty acid mixture comprised of stearic, palmitic and oleic acids
[9]Sulfenamide sulfur vulcanization accelerator as Vulkacit CZ/EG ™ from Bayer AG The rubber compositions are prepared by mixing the ingredients, other than the sulfur and said accelerators in two sequential preliminary "non-productive" mixing steps in an in internal rubber mixer followed by mixing the product in a final "productive" mixing step, also in an internal rubber mixer, in which the sulfur and sulfur cure accelerator are added.

The mixed ingredients were dumped from each of the respective internal rubber mixers, sheeted from an open mill roll and allowed to cool at least down to 40° C., or lower, prior to the next mixing step.

The following Table 2 illustrates cure behavior and various physical properties of rubber Samples A through D based upon the basic formulation of Table 1.

TABLE 2

| | Rubber Compositions (phr) | | | |
|---|---|---|---|---|
| | A | B | C | D |
| Ingredients (phr) | | | | |
| Pre-treated precipitated silica | 70 | 70 | 70 | 70 |
| Bis(3-trialkoxysilylpropyl) polysulfide composite A | 0 | 2 | 0 | 2 |
| Bis(3-trialkoxysilylpropyl) polysulfide composite B | 0 | 0 | 2 | 2 |
| Physical Properties | | | | |
| Dynamic storage modulus (G'), RPA[1], (MPa), 8.3 Hertz, 0.83% strain, 100° C., uncured rubber | 0.29 | 0.30 | 0.32 | 0.35 |
| RPA[1], 100° C., (cured at 191° C. for 16 minutes) | | | | |
| Tan delta (10% strain) | 0.129 | 0.107 | 0.105 | 0.081 |
| Dynamic storage modulus (G'), 1% strain, (MPa) | 0.87 | 1.04 | 1.02 | 1.23 |
| Zwick tensile[2] (cured at 150° C. for 32 minutes) | | | | |
| 300 percent ring modulus (MPa) | 8.3 | 11.1 | 10.9 | 14.5 |
| Elongation at break (%) | 485 | 465 | 453 | 413 |
| Tensile strength at break (MPa) | 14.7 | 17.7 | 17 | 19.4 |

TABLE 2-continued

| | Rubber Compositions (phr) | | | |
|---|---|---|---|---|
| | A | B | C | D |
| Rebound | | | | |
| 23° C. | 54 | 55 | 56 | 58 |
| 100° C. | 64 | 68 | 67 | 72 |
| Shore A hardness (23° C.) | 55 | 59 | 61 | 65 |
| Abrasion Resistance (DIN)[3] | | | | |
| (Wear Resistance Indicator) | | | | |
| Relative volume loss | 213 | 128 | 113 | 92 |

[1]Data from Rubber Process Analyzer "RPA" instrument
[2]Data from Zwick instrument
[3]DIN53601 or equivalent From Table 2 it can be seen that uncured storage modulus G' rubber processing values are somewhat beneficially increased for all of uncured experimental rubber Compositions B and C which contained the individual alkoxysilane polysulfides A or B, and also for experimental Composition D containing the combination of alkoxysilane polysulfides A and B as compared to Control rubber Composition A, yet are considered to remain in an acceptable range for efficient rubber processing.

It can further be seen that the storage modulus G' values for the cured rubber are higher for both of Experimental rubber Compositions B and C, which contain the individual alkoxysilane polysulfides A or B, respectively, and significantly higher for experimental rubber composition D containing the combination of alkoxysilane polysulfides A and B as compared to Control rubber Composition A, based on both the storage modulus G' values for both the uncured and cured rubber composition. This demonstrates a successful evaluation of use of the combination of alkoxysilane polysulfides in the uncured and cured rubber compositions.

It can additionally be seen in Table 2 that this evaluation also demonstrates a beneficial increase in stiffness of the cured rubber composition when using the combination of the alkoxysilyl polysulfides as evidenced by an increase in both of the 300 percent modulus and the Shore A hardness values for Experimental rubber Composition D.

This discovery is considered as being significant because, while use of the combination of alkoxysilyl polysulfides resulted in an increase in stiffness of the cured rubber composition their use did not significantly affect the processability of the uncured rubber composition as the increase in the green (uncured) storage modulus (G') is considered here to be of a minor nature from the rubber processability view and is considered to be within an acceptable range for rubber processing (e.g. mixing, extruding, shaping and calendering).

The hot rebound values (100° C.) for the Experimental rubber compositions B and C remained in a desirable range of from 67 to 68 as compared to Control rubber Composition A value of 65 and significantly improved to a value of 72 for Experimental rubber Composition D using the combination of alkoxysilyl polysulfides which is an additional beneficial indication of use of the combination of alkoxysilyl polysulfides in the rubber composition.

The Tan delta values for cured Experimental rubber Compositions B and C were beneficially approximately 0.1 compared to a value of 0.127 for the Control rubber Composition A and of 0.058 for the Experimental rubber Composition D which is an additional beneficial indication for use of the combination of alkoxysilyl polysulfides in the rubber composition.

This evaluation is considered to be a significant discovery because the Experimental rubber composition D, which used the combination of alkoxysilyl polysulfides, demonstrated that a combination of both suitable increased stiffness for the uncured rubber compositions to promote better silica dispersion within the rubber composition while mixing the uncured rubber composition and also an increased stiffness of the cured rubber composition combined with an outstanding hot rebound value to promote an acceptable rubber hysteresis with an associated predictive restriction on internal heat generation during its use and working in a tire with an accompanying acceptable beneficial restriction (e.g. beneficial reduction) for rolling resistance for a tire with a tread of such rubber to promote vehicular operational fuel savings.

This evaluation considered herein to provide the indicated result as being unpredictable without the evaluative experimentation for use of the combination of alkoxysilylpolysulfides.

Interestingly, it is also seen that the abrasion resistance (DIN) of Experimental rubber Composition D increased significantly (improved since less rubber was abraded away by the test), as compared to the Control rubber Composition A and also to the Experimental rubber Compositions B and C which is a further indication of the successful evaluation of use of the combination of the alkoxysilyl polysulfides A and B as a further unpredicted evaluative result until the aforesaid experimentation was made.

It is concluded, as indicated above, that a significant aspect of the experimentation, and resulting discovery, is that the inclusion of a small amount of both of the alkoxysilyl polysulfides in the rubber composition which contained the pretreated precipitated silica enabled a beneficial increase of stiffness of the uncured rubber composition during its mixing stage to aid in dispersing the silica as well enabling a beneficial increase in stiffness of the ultimately cured rubber composition as evidenced by the dynamic storage modulii (G') for both the uncured and cured rubber composition and also beneficially increased the quality of dispersion of the precipitated silica within the rubber composition as evidenced by the increased resistance to abrasion as evidenced by its DIN abrasion value.

While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process of preparing a rubber composition is provided which comprises the steps of:
   (A) blending a rubber composition, in at least one preliminary blending step, comprised of:
      (1) 100 phr of at least one conjugated diene-based elastomer,
      (2) from about 25 to about 120 phr of reinforcing filler comprised of pretreated silica, and
      (3) from about 0.3 to about 8 phr of a combination of two bis(3-triethoxysilylpropyl) polysulfides comprised of:
         (a) a first bis(3-triethoxysilylpropyl) polysulfide having an average of from 2 to about 2.4 connecting sulfur atoms in its polysulfidic bridge, and (b) a second bis(3-triethoxysilylpropyl) polysulfide having an average of from 3.4 to about 3.8 connecting sulfur atoms in its polysulfidic bridge, wherein a ratio in a range of from about 20/80 to about 80/20 of said first and second bis(3-triethoxysilylpropyl) polysulfides is used, followed by:

(B) blending, in a subsequent blending step, with the rubber composition from said preliminary blending step(s) a sulfur curative comprised of elemental sulfur;

wherein said pre-treated silica is a precipitated silica treated with a silica coupling agent to form a composite of precipitated silica/coupling agent prior to addition to said rubber composition, wherein said silica coupling agent for said composite is comprised of a siloxyorganomercaptosilane.

2. The process of claim 1 where said diene-based elastomer is comprised of at least one of cis 1,4-polyisoprene, cis 1,4-polybutadiene rubber, styrene-butadiene rubber, styrene-isoprene-butadiene terpolymer rubber, styrene-isoprene rubber and isoprene-butadiene rubber.

3. The process of claim 1 wherein at least one of said elastomers is a tin or silicon coupled diene-based elastomer of styrene and 1,3-butadiene monomers or of 1,3-butadiene monomer.

4. The process of claim 2 wherein at least one of said elastomers is a tin coupled styrene/butadiene elastomer prepared by organic solvent polymerization in the presence of a suitable tin-based catalyst complex using styrene and 1,3-butadiene monomers.

5. The process of claim 1 wherein at least one of said diene-based elastomers is an in-chain or end functionalized diene-based elastomer, wherein said functionalized elastomer contains one or more functional groups comprised of at least one of hydroxyl groups, carboxyl groups, amine groups, siloxy groups, and epoxy groups which are available to participate in a reaction with hydroxyl groups on the said precipitated silica.

6. The process of claim 5 wherein said functionalized elastomer is a styrene/butadiene elastomer containing at least one of amine and siloxy groups.

7. The process of claim 5 wherein said functionalized elastomer is comprised of a tin coupled styrene/butadiene elastomer containing siloxy end functionalization.

8. The process of claim 3 wherein at least one of said diene-based elastomers is an in-chain or end functionalized diene-based elastomer, wherein said functionalized elastomer contains one or more functional groups comprised of at least one of hydroxyl groups, carboxyl groups, amine groups, siloxy groups, and epoxy groups which are available to participate in a reaction with hydroxyl groups on the said precipitated silica.

\* \* \* \* \*